(12) United States Patent
Urry

(10) Patent No.: US 8,130,222 B1
(45) Date of Patent: Mar. 6, 2012

(54) SYSTEM AND METHOD FOR RESOLVING VISUAL PRIORITY AMONG COINCIDENT PRIMITIVES

(75) Inventor: Russell Joseph Urry, West Jordan, UT (US)

(73) Assignee: Rockwell Collins Simulation and Training Solutions LLC, Cedar Rapids, IA (US)

( * ) Notice: Subject to any disclaimer, the term of this patent is extended or adjusted under 35 U.S.C. 154(b) by 1765 days.

(21) Appl. No.: 10/969,459

(22) Filed: Oct. 19, 2004

(51) Int. Cl.
 *G06T 15/40* (2011.01)
(52) U.S. Cl. ........................................... 345/422
(58) Field of Classification Search .................. None
 See application file for complete search history.

(56) References Cited

U.S. PATENT DOCUMENTS

| 5,280,568 | A | | 1/1994 | Obata |
| 5,579,456 | A | | 11/1996 | Cosman |
| 5,867,166 | A | * | 2/1999 | Myhrvold et al. ............ 345/419 |
| 6,052,125 | A | | 4/2000 | Gardiner et al. |
| 6,346,939 | B1 | * | 2/2002 | Isaacs ........................... 345/421 |
| 6,362,818 | B1 | | 3/2002 | Gardiner et al. |

OTHER PUBLICATIONS

Object Fuzz in Computer Graphics Systems, Apr. 1992, IBM Technical Disclosure Bulletin, vol. 34, Issue 11, pp. 37-38.*
Foley, Van Dam, Feiner, Hughes Computer Graphics Principles and Practice Second Edition in C "Visible-Surface Determination" pp. 649-717.

* cited by examiner

*Primary Examiner* — Said Broome
(74) *Attorney, Agent, or Firm* — Thorpe North & Western LLP

(57) ABSTRACT

A system and method is disclosed for resolving visual priority among coincident primitives for a computer graphics system. The method can include the operation of classifying primitives within a computer generated scene into an ordinary group and one or more coincident groups according to each primitive's visual depth set comprising a depth value, a group value, and a layer value. The primitives within the ordinary group can be rendered according to their depth value. The primitives within the same coincident group can be rendered according to their layer value.

24 Claims, 4 Drawing Sheets

SYSTEM AND METHOD FOR RESOLVING VISUAL PRIORITY AMONG COINCIDENT PRIMITIVES

FIELD OF THE INVENTION

The present invention relates generally to the field of computer graphics.

BACKGROUND OF THE INVENTION

Before an image can be rendered by a computer graphics system, it must first be modeled in a format that the computer can utilize. Modeling techniques and tools describe a virtual environment with primitives that can be rendered by the graphics hardware. Primitives are basic geometric shapes such as polygons, cubic patches or surfaces, and so forth. These primitives can be stretched and rotated into any position, thus allowing the construction of complex forms.

Regardless of the method used to model the virtual environment, the graphics hardware (or software) must convert the modeled primitives into an array of frame buffer pixels that can be drawn on a display device. This process of converting modeled primitives into visible pixels is known as rendering.

An important part of the rendering process is known as hidden surface removal. Hidden surface removal determines which primitives in the scene should be visible for any given pixel (or sub-pixel if anti-aliasing techniques are employed). Common hidden-surface-removal techniques include the painter's algorithm, list-priority algorithms, scan line algorithms, and Z buffering, which is also known as depth buffering.

Each of the hidden-surface removal techniques has distinct advantages and disadvantages. For various reasons, the depth buffer has now become a popular choice. Most of the other approaches require special modeling strategies and support structures in order to render the image properly. The depth buffer approach eliminates many of these constraints, thereby simplifying the modeling process. With a depth buffer, the visible surface at each pixel (or sub-pixel) is simply the primitive with the closest depth value for each pixel. As each primitive is rendered, this depth parameter is computed for each pixel touched. Along with storing the color of each pixel, a frame buffer can be expanded to also store the depth value. As each new primitive is processed, the new depth is compared with the one already in the frame buffer. The frame buffer then simply keeps whichever primitive is closest to the observer.

The depth buffer technique tends to break down for primitives that are coincident with each other. A primitive is considered to be coincident if it has substantially the same depth as another primitive, such as a stripe on a road or a door on a side of a building. Limited computing precision when specifying the position of primitives relative to one another makes it mathematically difficult to consistently compute which surface is on top. Various techniques have been developed to assist the depth buffer to correctly select which primitive is closer to the view point. These techniques include depth value scale/offset, reference planes, stencil buffer, etc. Each of these techniques complicates the basic depth buffer algorithm in some way. Most place restrictions on the rendering process such as handling the primitives in a specific order (fix-listing) or requiring additional information to accompany the primitives.

In most rendering architectures, hidden surface removal is now accomplished using a depth buffer. For each pixel (or sub-pixel) in the scene, the depth buffer compares the depths of each primitive that touches it and keeps the one that is closest. The basic depth buffer consists of a simple comparison between an incoming pixel's depth value and the value already stored in the depth buffer. The incoming pixel's address within the 2-dimensional array of pixels stored in the frame buffer is used to select which depth is compared with the incoming depth.

Many techniques have been developed to augment this simple test when it is unable to correctly resolve the ordering between two coincident primitives. Each of these techniques is based on two assumptions. First, the assumption that the modeler must specify the correct visual priority order of coincident primitives. Since the order can't be computed, it must be defined. Second, the rendering process must correctly interpret and enforce that defined order.

The simpler methods adjust the primitive's depth value such that it is forced in front or behind another primitive based on its modeled priority. This adjustment is usually a simple scale or offset of the depth value to exaggerate its position. This technique, however, is not very consistent. Adjustment values that work correctly for some primitives in the scene may not adjust other primitives far enough to be correctly resolved. In addition, other primitives in the scene may be moved too far and move in front of scene elements they are supposed to be behind.

Stencil buffering is a technique that provides a second value besides depth that can be independently stored and tested in conjunction with the depth test. A "stencil" value can be assigned to "child" primitives that lie on top of "parent" primitives. In frame buffer locations where the parent primitive can win the regular depth test, it can also mark the stencil buffer with its unique "stencil" value. The child primitive is able to be placed on top of the parent primitive where it belongs due to the associated stencil value stored in the frame buffer.

While this technique is useful, it relies on the primitives being rendered in a fixed order to correctly resolve the visual priority. There are also restrictions relative to the management of the stencil buffer such that multiple different coincident groups within the scene do not conflict.

In addition, most of these coincident primitive extensions are not completely compatible with advanced depth reduction techniques in use. For instance, the techniques may require rendering the primitives in a back-to-front order. Others require all of the pixels of all of the primitives to be rendered. This incompatibility reduces or eliminates the benefits associated with these advanced techniques when coincident primitives are rendered.

SUMMARY OF THE INVENTION

A system and method is disclosed for resolving visual priority among coincident primitives for a computer graphics system. The method can include the operation of classifying primitives within a computer generated scene into an ordinary group and one or more coincident groups according to each primitive's visual depth set comprising a depth value, a group value, and a layer value. The primitives within the ordinary group can be rendered according to their depth value. The primitives within the same coincident group can be rendered according to their layer value.

DETAILED DESCRIPTION

Figure 1A:
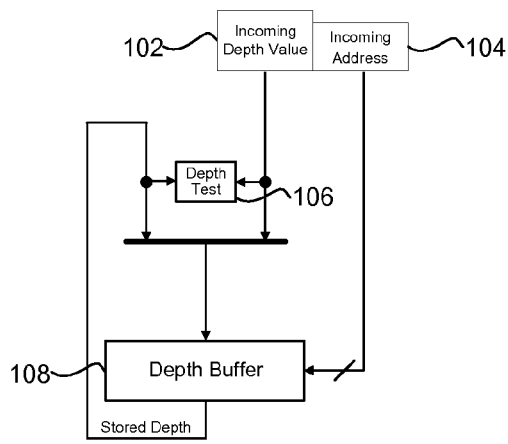
FIGS. 1a-c are block diagrams illustrating tests used in a system for resolving visual priority among coincident primitives in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2A:
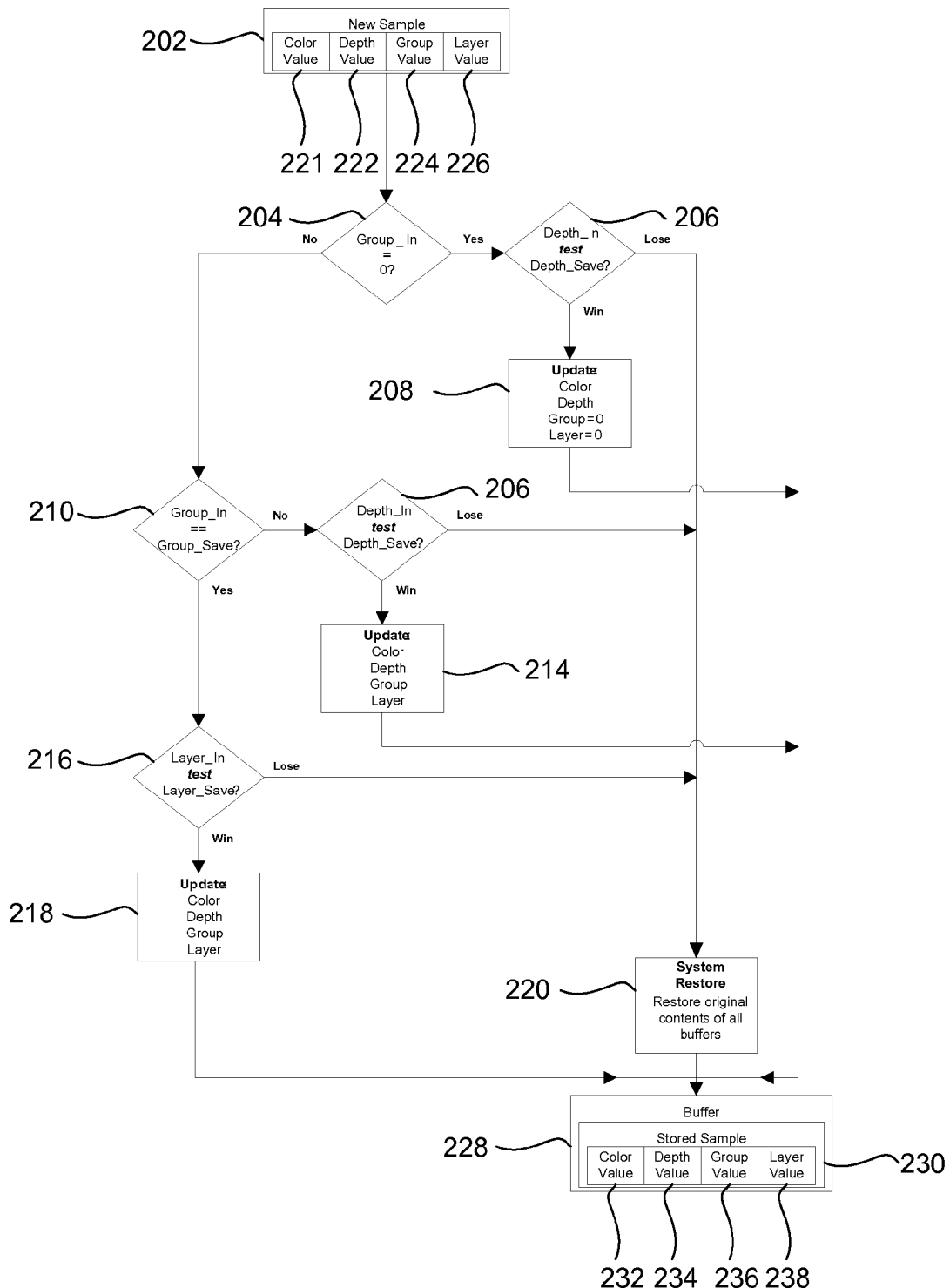
FIG. 2a is a block diagram illustrating an embodiment of a system for resolving visual priority rendering among coincident primitives using the tests illustrated in FIG. 1.
Figure 2B:
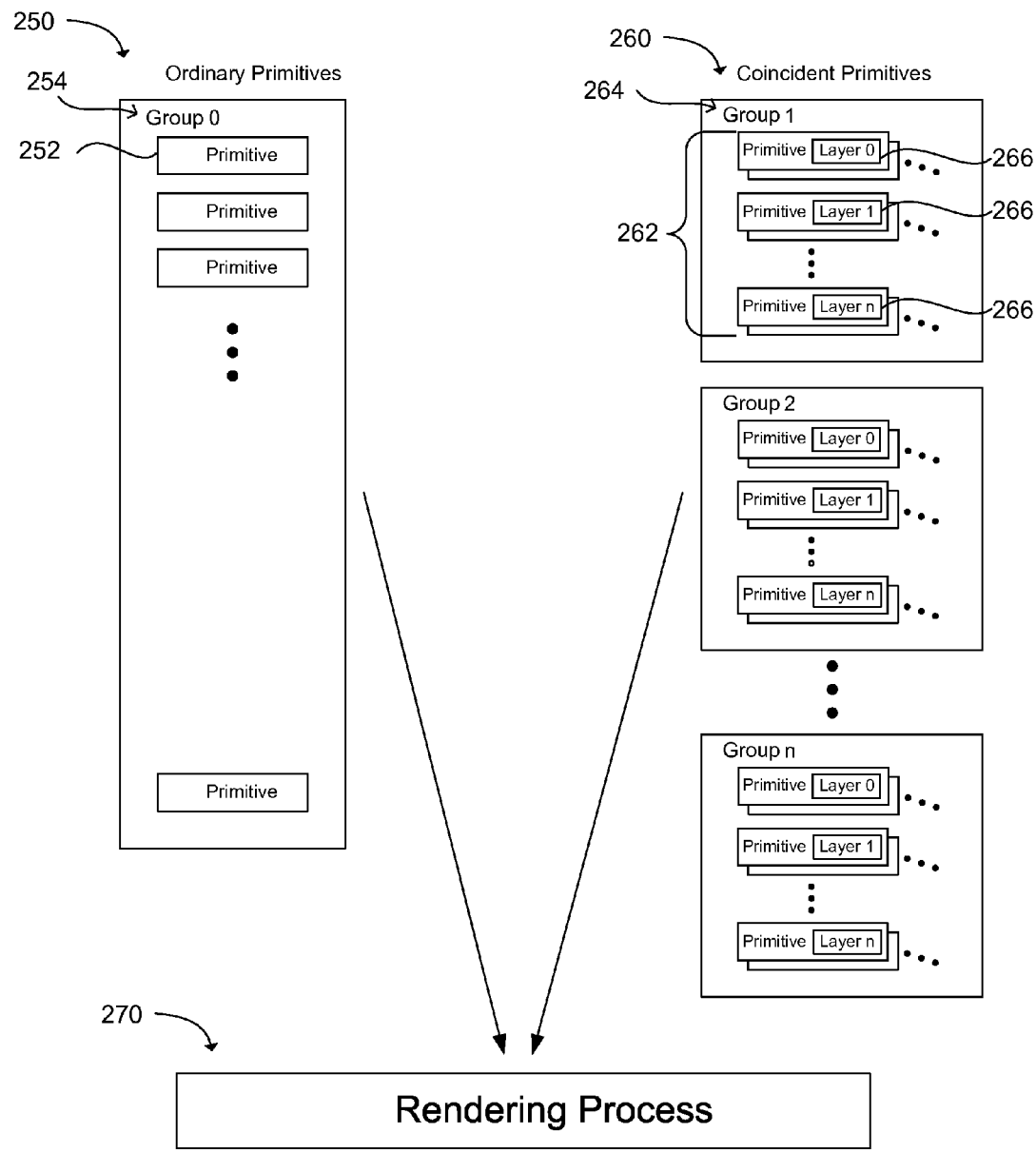
FIG. 2b is a block diagram illustrating a rendering process for primitives in ordinary and coincident groups in accordance with an embodiment of the present invention.
Figure 3:
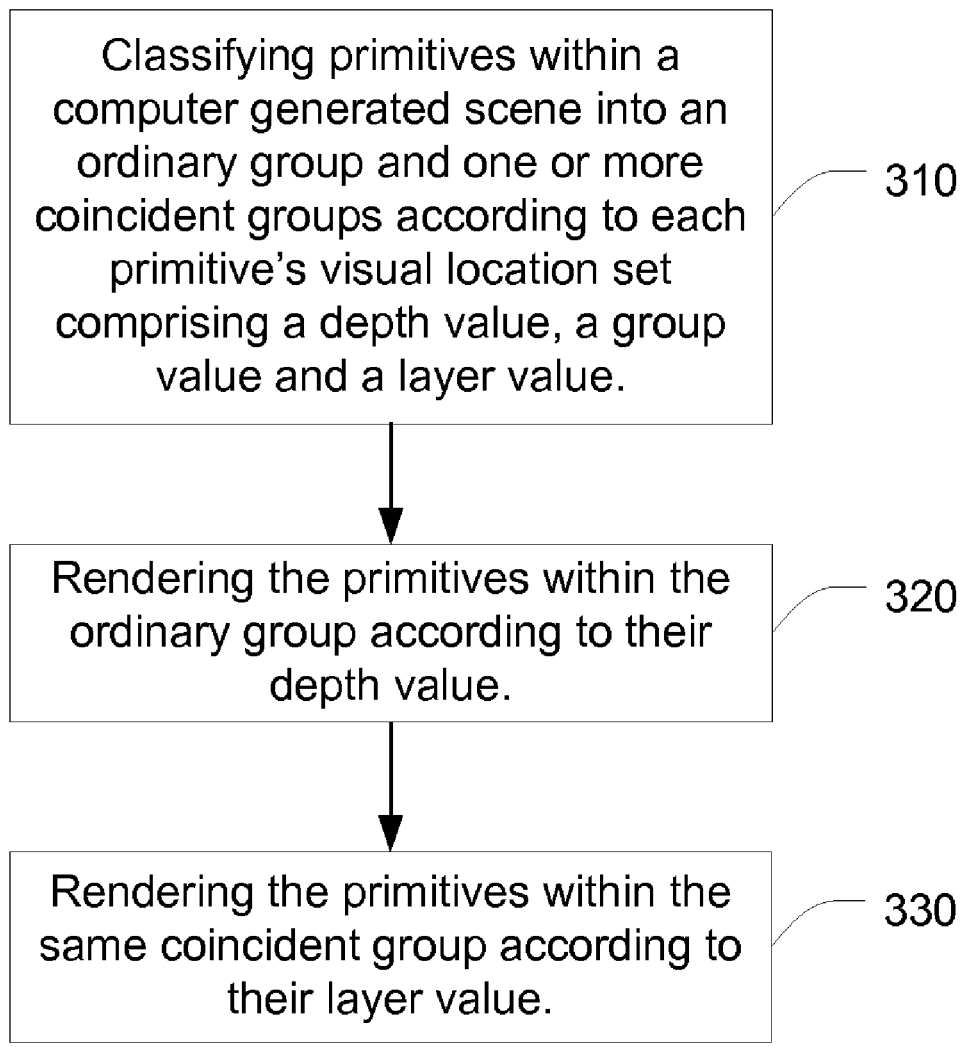
FIG. 3 is a flow chart depicting a method for resolving visual priority rendering among coincident primitives in accordance with an embodiment of the present invention.

In order to overcome the problems described and to provide an efficient method for rendering primitives, the present invention provides a system and method for resolving visual priority among coincident primitives for a computer graphics system as depicted in FIGS. 1-3. The present invention can remove rendering order restrictions associated with previous methods and can thus allow coincident and ordinary primitives to be rendered in any order relative to each other.

In the present invention, a modeler can define the visual priority relationship of coincident primitives without respect to rendering order. When creating a scene, a modeler can classify the geometric primitives of a scene into one of two different types relative to visual priority. First, geometric primitives can be classified into an ordinary group if the primitives can be resolved by the depth value alone. Second, all geometric primitives in a scene that are coincident to another primitive, such as a stripe on a road or a door on a building, are assigned to one or more coincident groups.

Each coincident group can be a collection of primitives that form layers on a common simple surface. For example, a single plane is a simple surface. Other surfaces such as polygon models, cubes, cylinders, spheres, and other shapes are also possible as long as the shapes are concave or convex but not both.

Each coincident group can be assigned a unique group value. Each coincident primitive can also be assigned a layer value to define the primitive's priority relative to other coincident primitives in the same coincident group. Outside of the group, coincident primitives rely on the simple depth test to resolve between coincident primitives of other groups and ordinary primitives in the scene.

Thus, each primitive within a scene has a visual depth set comprising at least three values. First, all primitives can have a depth value assigned. Second, a group value can be assigned to primitives in the coincident group. The group value comprises a specified number that is unique from every other group in the scene. This number is common to all coincident primitives within the same group. For ordinary primitives the group value can be set to zero. Third, a layer value can be assigned to primitives in the coincident group. Primitives on each layer of a coincident group can be assigned a layer value in visual priority order. For example, layer 0 may have the lowest priority and layer n may have the highest priority. For ordinary primitives, this value can be ignored, but can be set to zero for the purpose of consistency. In this embodiment, the contents of the frame buffer can be extended from storing just color and depth at each pixel to also storing the group and layer value.

The rendering order-independence feature of groups and layers works in a more beneficial manner when primitives with the same layer number within a given group do not overlap. If overlapping primitives do share the same layer number, rendering order then determines the final visual priority. Such circumstances may produce inconsistent visual results and overlapping is best avoided. Primitives which share the same layer number can be clipped to eliminate overlapping regions. Alternatively, if the primitive cannot be clipped then the coincident group may be fixed-listed to guarantee consistent rendering order.

Figure 1B:
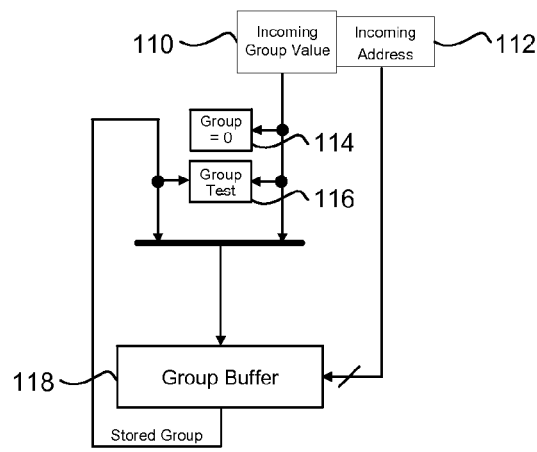
Figure 1C:
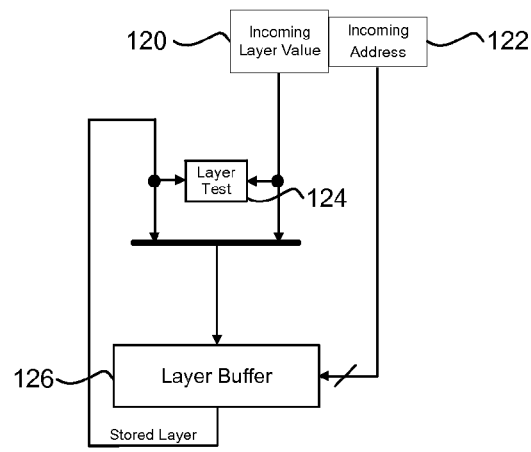

A basic visual priority test, comprising four independent tests, can be performed on each primitive's visual depth set, as shown in FIGS. 1a-c. The basic visual priority test compares the depth, group, and layer values of an incoming primitive, pixel, or sub-pixel with its counterpart stored previously. These values can be tested independently from each other and the test results can be logically combined to correctly resolve each type of situation. Each of the tests will be discussed independently below. A system for resolving visual priority among coincident primitives using the four tests will then be discussed.

First a "group zero" test 114, shown in FIG. 1b, can be performed to determine the difference between ordinary and coincident primitives. A primitive with a group value equal to zero is a member of the ordinary group and can be rendered according to the second test, the "depth" test 106, shown in FIG. 1a. In the depth test, an incoming depth value 102 can be sent to an incoming address 104 in the depth buffer 108 to be compared with the stored depth value at the same address. If the primitive with the incoming depth value is closer to the view point than the stored primitive depth value, then the incoming depth value can replace the stored depth value at the specified depth buffer address.

A third test is the "group equal" test 116, shown in FIG. 1b. An incoming group value 110 can be sent to an incoming address 112 in the group buffer 118 to be compared with the stored group value at the same address. If the primitive with the incoming group value is equal to the stored group value, then a layer test 124, discussed below, can be used. If the incoming group value is not equal to the stored group value, then a depth test 106 can be used, as previously discussed.

A fourth test is the "layer" test 124, shown in FIG. 1c. An incoming layer value 120 can be sent to an incoming address 122 in the layer buffer 126 to be compared with the stored layer value at the same address to determine whether the primitive with the incoming layer value has a higher priority than the stored layer value. In one embodiment, priority can be defined as 0 having the lowest priority and n having the highest priority, wherein n is the maximum value of the bits in the layer value. When an incoming layer value is of a higher priority than the stored layer value, then the incoming layer value can be stored in place of the stored layer value. If the incoming layer value is of a lower priority than the stored layer value, then the stored layer value can continue to be displayed.

The four tests can be combined as shown in the block diagram in FIG. 2a. A new sample 202, with a previously assigned color value 221, depth value 222, group value 224, and layer value 226 can be compared with a stored sample 230 in a buffer 228. The stored sample is the sample located at the address in the frame buffer to which the new sample can be sent.

The new sample 202 can be tested using the group zero test 204 to determine whether the new sample's group value 224 is equal to zero. If the group value is equal to zero, a depth test 206 can be performed to determine if the new sample has a depth value 222 closer to the view point or eye-point than the depth value 234 of the stored sample 230. If the new sample does not have a depth value closer to the view point than the stored sample, then a system restore 220 is performed and the original contents of the data can be restored in the buffer 228.

If the new sample does have a depth value closer to the view point than the stored sample then an update 208 can be performed and the new color value 221 and depth value for the new sample can be entered into the buffer in place of the stored values. The group value 224 and layer value 226 can be set to zero. After the update is performed, the next new sample 202 can be tested.

If the group zero test 204 for an incoming pixel is not equal to zero, then a group equal test 210 can be performed to determine if the new sample's 202 group value 224 is equal to the stored sample's 230 group value 236. If the new sample and stored sample's group values are not equal, then a depth test 206 test can be performed to determine if the new sample has a depth value 222 closer to the view point than the stored sample's depth value 234. If the new sample does not have a depth value closer to the view point than the stored sample, then a system restore 220 can be performed and the original contents of the data can be restored to the buffer 228. If the new sample does have a depth value closer to the view point than the stored sample, then an update 214 can be performed and the new color 221, depth 222, group 224, and layer 226 values can replace the stored sample's values in the buffer.

If the group equal test 210 is performed and the new sample's 202 group value 224 is determined to be equal to the stored sample's 230 group value 236, then a layer test 216 can be performed to determine whether the new sample's layer value 226 is of higher priority than the stored sample's layer value 238. If the new sample's layer value is of lower priority than the stored sample's layer value, then a system restore 220 can be performed and the stored sample's color 232, depth 234, group 236, and layer 238 values can be restored to the buffer 228. If the new sample's layer value is of higher priority than the stored sample's layer value, then an update 218 can be performed and the new sample's color 221, depth 222, group 224, and layer 226 values can replace the stored sample's values in the buffer.

Another embodiment of the invention provides a method for resolving visual priority among coincident primitives for a computer graphics system as depicted in the flow chart of FIG. 3. The method includes step 310, which involves classifying primitives within a computer generated scene into an ordinary group and one or more coincident groups according to each primitive's visual depth set comprising a depth value, a group value, and a layer value. Each primitive in the scene can be classified into an ordinary group, wherein the group value of the primitive is equal to zero, and one or more coincident groups, wherein the group value of the primitive is not equal to zero. The visual depth set for each primitive in the scene can be stored in a separate specific location. For example, the pixels comprising the primitive may be stored in an M by N location in a two-dimensional frame buffer. Incoming primitive's visual depth sets can then be compared with a stored primitive's visual depth set, wherein the stored primitive is located at the same specific location as the incoming primitive.

A further step 320 includes rendering the primitives within the ordinary group according to their depth value. Rendering the primitives within an ordinary group according to their depth value can be accomplished using the depth test 206 (FIG. 2*a*), as previously discussed. Another step 330 involves rendering the primitives within the same coincident group according to their layer value. This step can be accomplished using the layer test 216 (FIG. 2*a*), as previously discussed. The primitives can also be rendered according to the group equals test 210 (FIG. 2*a*) when the group value of a primitive in the coincident group is not equal to a stored group value, in which case the depth test 206 would again be used. Finally, if the group value of a primitive in the coincident group is equal to a stored group value, then a layer test 216 can be used.

The rendering of the primitives within the ordinary and coincident groups is illustrated in an exemplary embodiment in FIG. 2*b*. An ordinary primitives group 250 is illustrated that includes primitives 252 that can be rendered based on a depth test 106 (FIG. 1*a*). The ordinary primitives group can be labeled as Group 0 254. The primitives in the ordinary group can be sent to a rendering process 270 and rendered based on the depth test. A plurality of coincident groups 260 are illustrated, each having a coincident group number 264. The group numbers are illustrated from 1 to n. Of course, any hierarchal numbering system may be used. The numbers 1 to n are shown for illustration purposes only. Primitives 262 that are located on the same surface can be organized into groups by a modeler, as previously discussed. Each primitive that overlaps on the surface can be assigned a different layer number 266, such as layer 1 to layer n. Primitives that do not overlap can be assigned the same layer number as other primitives within the coincident group. The primitives in the coincident groups can be sent to the rendering process 270, as previously discussed.

This method can also be applied at higher levels of abstraction, such as pixel arrays instead of just pixels or sub-pixels.

This invention is valuable because it provides a unified method of specifying both ordinary and coincident primitives (group and layer) such that special case handling can be eliminated. The invention provides a simpler and more general method to correctly resolve the visual priority of coincident primitives. The modeler has more flexibility by being able to consider elements within the synthetic environment on both a global (group) and local (layer) level when producing the definition of visual priority. The rendering process is simplified by reducing the complexity of the operations required to correctly and consistently interpret the intended visual priority of complex models specified by the modeler.

The invention provides the ability to do more complex comparisons to ease or remove many of the restrictions and special cases of existing hidden surface removal methods relating to coincident primitives. It also simplifies the work of rendering software that interprets the model and drives the rendering process because grouping and layering are embedded in the model and do not require special interpretation.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method for resolving visual priority among coincident primitives for a computer graphics system, comprising the steps of:
   classifying primitives within a computer generated scene into an ordinary group and at least one coincident group according to each primitive's visual depth set comprising a depth value, a group value, and a layer value to enable order independent rendering of the primitives;

rendering the primitives within the ordinary group according to their depth value;
rendering the primitives within coincident groups according to their layer value; and
displaying the rendered primitives on a display device.

2. A method as in claim 1, further comprising the steps of:
classifying the primitives in a scene into the ordinary group if the group value is zero;
classifying the primitives in a scene into the at least one coincident group if the group value is not equal to zero.

3. A method as in claim 2, further comprising the step of storing each primitive in a scene in a specific address in a frame buffer.

4. A method as in claim 3, further comprising the step of comparing an incoming pixel's visual depth set with a stored pixel's visual depth set, wherein the incoming pixel's visual depth set replaces the stored pixel's visual depth set if the incoming pixel's visual depth set passes depth, group zero, group equal, and layer tests.

5. A method as in claim 4, further comprising the step of comparing an incoming pixel's visual depth set with a stored pixel's visual depth set, wherein the stored pixel's visual depth set is to be kept at the specific address in the frame buffer of the stored pixel if the incoming pixel's visual depth set does not pass the depth, group zero, group equal, and layer tests.

6. A method as in claim 5, further comprising the step of storing the incoming pixel at an M by N location in a two dimensional frame buffer.

7. A method as in claim 6, further comprising the step of rendering an incoming pixel in a coincident group according to its depth value if the incoming pixel's group value is different than the stored pixel's group value that is at the specific location.

8. A method as in claim 7, further comprising the step of defining a layer with a value of zero to have a lowest priority, wherein the priority increases as the layer value increases.

9. A method as in claim 8, further comprising the step of defining each coincident group to be a collection of pixels that form layers on a simple surface.

10. A method as in claim 9, further comprising the step of defining a simple surface as a surface that does not comprise both a concave surface and a convex surface.

11. A method as in claim 10, further comprising the step of storing the incoming pixel in the ordinary group in place of the stored pixel if the depth value of the incoming pixel is closer to a view point than the depth value of the stored pixel.

12. A method as in claim 11, further comprising the step of keeping the stored pixel at the specific location if the depth value of the incoming pixel in the ordinary group is not closer to the view point than the depth value of the stored pixel.

13. A method as in claim 10, further comprising the step of storing the incoming pixel in the coincident group in place of the stored pixel if the incoming pixel's group value is different than the stored pixel's group value and the incoming pixel's depth value is closer to a view point than the depth value of the stored pixel.

14. A method as in claim 13, further comprising the step of keeping the stored pixel at the specific location if the incoming pixel's group value is different than the stored pixel's group value and the incoming pixel's depth value is not closer to the view point than the depth value of the stored pixel.

15. A method as in claim 10, further comprising the step of storing the incoming pixel in the coincident group in place of the stored pixel if the incoming pixel's group value is equal to the stored pixel's group value and the incoming pixel's layer value has a higher priority than the stored pixel's layer value.

16. A method as in claim 15, further comprising the step of keeping the stored pixel at the specific location if the incoming pixel's group value is equal to the stored pixel's group value and the incoming pixel's layer value has a lower priority than the stored pixel's layer value.

17. A system for order-independent visual priority resolution of coincident primitives, comprising:
a computer configured to display graphic information;
a buffer memory in the computer configured to store a visual depth set, said visual depth set comprising a depth value, a group value, and a layer value for each pixel entering the buffer memory, said values enabling the computer to display each pixel in a graphic format;
the computer further configured to classify each pixel entering the buffer memory into an ordinary group and at least one coincident groups according to each pixel's visual depth set;
the computer further configured to render the primitives within the ordinary group according to their depth value; and
the computer further configured to render the primitives within the coincident groups according to their layer value.

18. A system as in claim 17, further comprising:
the computer further configured to classify each pixel entering the buffer memory wherein the group value of the pixel is equal to zero into the ordinary group; and
the computer further configured to classify each pixel wherein the group value is not equal to zero into the at least one coincident groups.

19. A system as in claim 18, further comprising:
the computer further configured to send an incoming pixel in the ordinary group to the specific location in the buffer and compare the incoming pixel with a stored pixel at the specific location; and
the computer further configured to compare the depth value of the incoming pixel with the depth value of the stored pixel and to replace the stored pixel with the incoming pixel if the depth value of the incoming pixel is closer to a view point than the depth value of the stored pixel.

20. A system as in claim 19, wherein the computer is configured to compare the depth value of the incoming pixel with the depth value of the stored pixel and to leave the stored pixel at the specific location if the depth value of the incoming pixel is not closer to the view point than the depth value of the stored pixel.

21. A system as in claim 18, further comprising:
the computer configured to send an incoming pixel in a coincident group to the specific location in the buffer and compare the incoming pixel with a stored pixel at the specific location; and
the computer configured to compare the group value and depth value of the incoming pixel with the group value and depth value of a stored pixel and to replace the stored pixel with the incoming pixel if the group value of the incoming pixel is not equal to the group value of the stored pixel and the depth value of the incoming pixel is closer to a view point than the depth value of the stored pixel.

22. A system as in claim 21, further wherein the computer is configured to compare the group value and depth value of the incoming pixel with the group value and depth value of the stored pixel and to leave the stored pixel at the specific location if the group value of the incoming pixel is not equal to the group value of the stored pixel and the depth value of the incoming pixel is not closer to the view point than the depth value of the stored pixel.

23. A system as in claim 18, further comprising:

the computer configured to send an incoming pixel in a coincident group to the specific location in the buffer and compare the incoming pixel with a stored pixel at the specific location; and the computer configured to compare the group value and layer value of the incoming pixel with the group value and layer value of a stored pixel and to replace the stored pixel with the incoming pixel if the group value of the incoming pixel is equal to the group value of the stored pixel and the layer value of the incoming pixel has a higher priority than the layer value of the stored pixel.

24. A system as in claim 23, wherein the computer is configured to compare the group value and layer value of the incoming pixel with the group value and layer value of the stored pixel and to leave the stored pixel if the group value of the incoming pixel is equal to the group value of the stored pixel and the layer value of the incoming pixel has a lower priority than the layer value of the stored pixel.

* * * * *